June 17, 1930.  H. DREYFUS  1,764,202
APPARATUS FOR THE PRODUCTION OF STAPLE FIBERS
Filed June 24, 1929
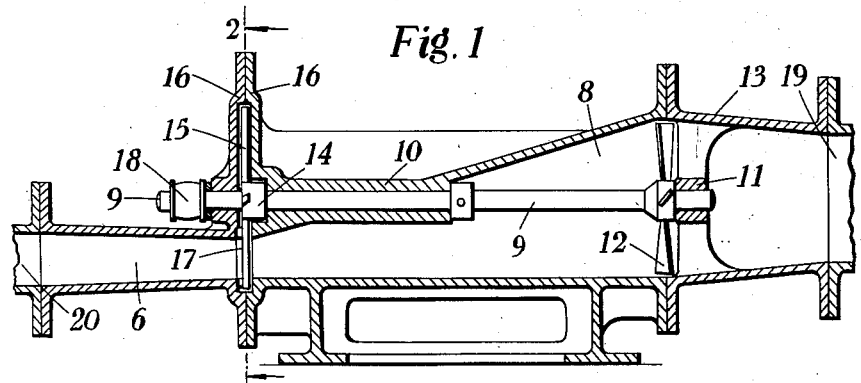
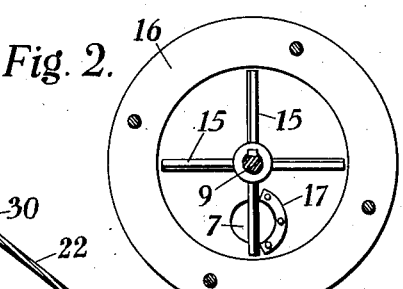
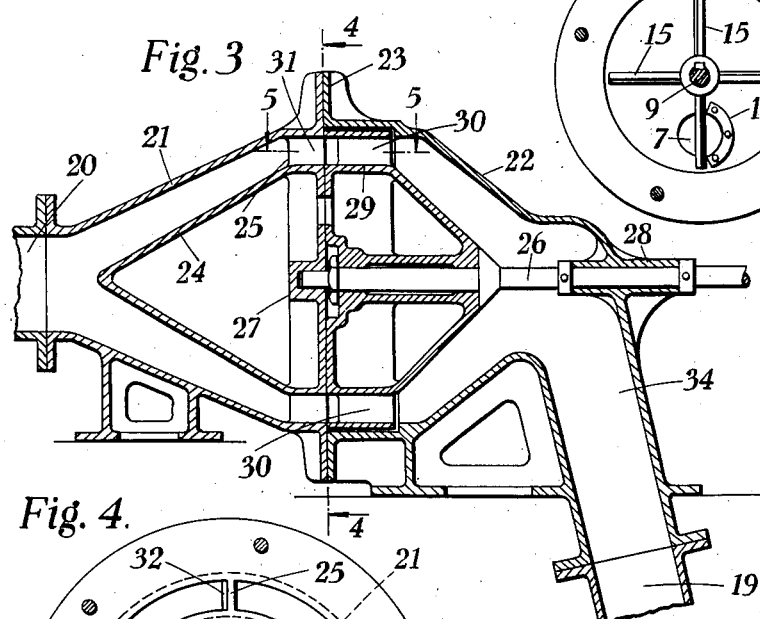
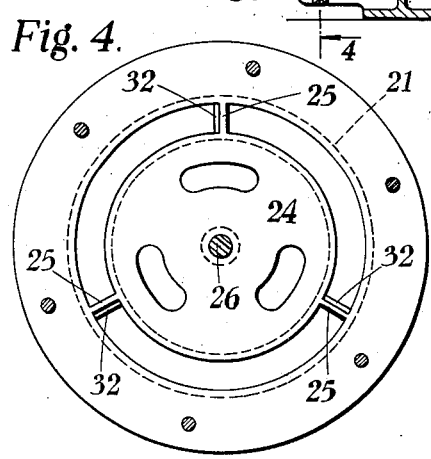
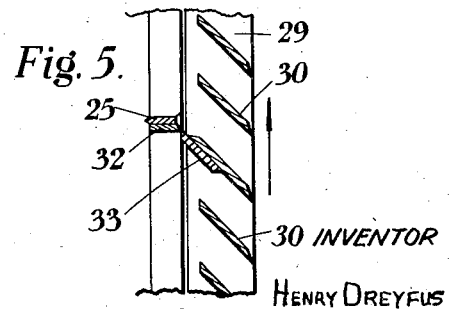
INVENTOR
HENRY DREYFUS
BY
*J. Seltzer + C. W. Levinson*
ATTORNEYS Patented June 17, 1930

1,764,202

UNITED STATES PATENT OFFICE

HENRY DREYFUS, OF LONDON, ENGLAND

APPARATUS FOR THE PRODUCTION OF STAPLE FIBERS

Application filed June 24, 1929, Serial No. 373,303, and in Great Britain June 12, 1928.

This invention relates to a new or improved apparatus whereby continuous yarns, threads, or filaments can be cut into staple fibers.

According to the invention, continuous lengths of yarns, threads, or filaments (hereafter referred to as "filaments") are conveyed along a desired path by means of a fluid stream created by a fan or impeller, and a cutting device operating in combination or conjunction with the fan or impeller severs the filaments into shorter lengths. The cutting device itself may act as the fan or impeller. A gaseous fluid medium, such as air, is preferably employed as the conveying medium. The fluid flow may be effected entirely by the fan or impeller, or additional suction or pressure means may be arranged to augment the flow of the conveying medium.

The accompanying drawings illustrate two embodiments of the invention, which are given by way of example only and are not to be construed as in any way limitative.

Fig. 1 is a vertical section of conveying and cutting apparatus according to the invention employing separate fan and cutting means;

Fig. 2 is an elevational view of a part of Fig. 1, viewed along the line 2—2;

Fig. 3 is a vertical section of a further form of apparatus in which the cutting and conveying means are combined;

Fig. 4 is an elevational view of a part of Fig. 3, viewed along the line 4—4; and Fig. 5 in a development is section taken on the line 5—5 of Fig. 3.

Referring to Figs. 1 and 2, 6 is a conduit whose outlet 7 is connected to a second conduit 8. A shaft 9 mounted in bearings 10, 11 and driven at any suitable speed, carries a fan 12 arranged in the conduit 8, the fan serving to cause a flow of fluid medium (hereafter referred to simply as "air") through the conduits 6, 8 and to discharge the air through a further conduit 13.

The shaft 9 also carries a cutting device 14, shown in the figures as comprising four radial blades 15, the device 14 being mounted in a housing 16 and adapted to bring its blades 15 in turn across the outlet 7 of the conduit 6. A fixed knife 17 is mounted along one edge of the outlet 7 to co-operate with the blades 15. The shaft 9 may be driven in any suitable manner, e. g. by means of a belt pulley 18. It may, however, be directly or otherwise coupled to an electric motor, as will be readily understood.

In operation, the fan 12 creates a flow of air through the conduits 6, 8 sufficient to propel filaments introduced into the conduit 6 past the outlet 7. The rotating blades 15 co-operate with the fixed blade 17 to sever the filaments into fiber which is carried through the conduits 8, 13 and delivered to a collecting device, such as, for example, a perforated or gauze basket. The conduit 13 may be connected to a conduit 19 which directs the fiber to any suitable point for collection, and may be continued to any desired extent.

The filaments to be cut may be taken from any convenient source and led either directly into the conduit 6 or into a conduit, such as 20, connected to the conduit 6. In the case of producing staple fiber from artificial filaments continuously with their production, the filaments may be led from the spinning machine (which is not illustrated as it forms no part of the invention) through the conduit 20 to the cutting device.

The length of staple fiber cut may be varied by regulating the speed of rotation of the cutting device 14 with respect to the rate of production of the filaments, the fan 12 serving to convey the filaments to the cutting device whatever their rate of production. The number of blades 15 of the cutting device may also be varied in accordance with the length to be cut.

Referring now to Figs. 3, 4, and 5, 21, 22 are tapered housings whose enlarged ends are connected together as shown at 23. A conical member 24 is mounted inside the housing 21, being integrally connected thereto by means of radial webs 25. A shaft 26 mounted in bearings 27, 28 carries a fan runner 29 provided with blades 30, the radial depth of which is the same as the radial width of the annular opening 31 between the housing 21 and the member 24. The shaft 26 being driven in any desired manner, the blades 30 cause a stream of air to pass through the housings 21, 22, filaments introduced into the housing 21 being carried to the annular opening 31.

Each of the webs 25 extending across the opening 31 carries a fixed blade 32 which cooperates with one or more blades 33 carried by the fan runner 29, the number of moving blades depending on the frequency of cut required. Conveniently, the or each moving blade 33 is mounted on one of the fan blades 30, as is clearly shown in Fig. 5. The filaments are thus severed into fiber by the blades 32, 33, the fiber being carried through the housing 22 by the air stream and discharged through a conduit 34.

The filaments may be led to the housing 21 in any suitable manner, for example, through a conduit 20 as described with reference to Fig. 1. The fiber may pass from the conduit 34 to a conduit 19 which directs it to any suitable point for collection.

Variation in the length of staple fiber cut may, as in the case of the apparatus shown in Figs. 1 and 2, be varied by regulating the speed of rotation of the fan 29 with respect to the rate of production of the filaments, and also by varying the number of fixed and moving cutting blades.

What I claim and desire to secure by Letters Patent is:—

1. Apparatus for the production of uniform staple fiber from continuous lengths of filaments, comprising an unobstructed conduit adapted to receive the filaments from a source of supply and for the passage of the filaments, an impeller arranged in said conduit and adapted to produce a filament conveying fluid stream through the conduit and a cutting blade in said conduit, means to actuate said blade to sever substantially uniform short lengths from the filaments fed through the conduit by the fluid stream, the impeller and cutting device being so arranged that the filaments are cut into lengths suitable for making "spun" yarn.

2. Apparatus for the production of uniform staple fiber from continuous lengths of filaments comprising an unobstructed conduit adapted to receive the filaments from a source of supply and for the passage of the filaments, an impeller arranged in said conduit and adapted to produce a filament conveying fluid stream through the conduit, a fixed cutting blade, a movable cutting blade adapted to co-operate with the fixed cutting blade to sever substantially uniform short lengths from the continuous filaments, and a shaft adapted to drive the impeller and the movable cutting blade.

3. Apparatus for the production of uniform staple fiber from continuous lengths of filaments, said apparatus comprising an unobstructed conduit adapted for the passage of the lengths of filaments, an impeller arranged in said conduit and adapted to produce a filament conveying fluid stream through the conduit, a fixed cutting blade, a movable cutting blade carried by said impeller and adapted to co-operate with the fixed cutting blade to sever substantially uniform short lengths from the continuous filaments, and a shaft adapted to drive the impeller and the movable cutting blade.

4. Apparatus for the production of uniform staple fiber from continuous lengths of filaments comprising an unobstructed conduit adapted to receive the filaments from a source of supply and for the passage of the filaments, an impeller arranged in said conduit and adapted to produce a filament conveying fluid stream through the conduit, a cutting blade in said conduit, means to actuate said blade to sever substantially uniform short lengths from the filaments fed through the conduit by the fluid stream, and a delivery conduit for the severed lengths, the impeller and cutting device being so arranged that the continuous filaments are cut into lengths suitable for making "spun" yarn.

5. Apparatus for the production of uniform staple fiber from continuous lengths of filaments, said apparatus comprising a conduit adapted for the passage of the lengths of filaments, an impeller arranged in said conduit and adapted to produce a filament conveying fluid stream through the conduit, a fixed cutting blade, a movable cutting blade carried by said impeller and adapted to co-operate with the fixed cutting blade to sever substantially uniform short lengths from the continuous filaments, a shaft adapted to drive the impeller and the movable cutting blade, and a delivery conduit for the severed lengths.

In testimony whereof I have hereunto subscribed my name.

HENRY DREYFUS.